United States Patent
Matsumoto

[19]

[11] Patent Number: 6,058,995
[45] Date of Patent: May 9, 2000

[54] PNEUMATIC RADIAL TIRES WITH SPECIFIED PROFILE

[75] Inventor: Hiroyuki Matsumoto, Kodaira, Japan

[73] Assignee: Bridgestone Corporation, Tokyo, Japan

[21] Appl. No.: 09/069,974

[22] Filed: Apr. 30, 1998

Related U.S. Application Data

[62] Division of application No. 08/836,224, filed as application No. PCT/JP96/01296, May 16, 1996, Pat. No. 5,849,118.

[30]    Foreign Application Priority Data

Sep. 8, 1995 [JP] Japan .................................. 7-231563
Jan. 17, 1996 [JP] Japan .................................... 8-5992

[51] Int. Cl.$^7$ ........................ B60C 13/00; B60C 13/02; B60C 17/08; B60C 9/02; B60C 3/00
[52] U.S. Cl. ......................... 152/454; 152/522; 152/523; 152/525; 152/548
[58] Field of Search ................................ 152/454, 523, 152/525, 548, 522

[56]       References Cited

U.S. PATENT DOCUMENTS 3,559,712  2/1971  Verdier .

3,961,657  6/1976  Chrobak .............................. 152/454 X
4,262,722  4/1981  Takigawa et al. .
5,394,918  3/1995  Kogure .................................... 152/523

FOREIGN PATENT DOCUMENTS 1-202502   8/1989   Japan .
1-314611  12/1989   Japan .
3-182813   8/1991   Japan .
5-262105  10/1993   Japan .
6-24214    2/1994   Japan .
62-27214   8/1994   Japan .
7-25206    1/1995   Japan .

*Primary Examiner*—Adrienne C. Johnstone
*Attorney, Agent, or Firm*—Suhgrue, Mion, Zinn, Macpeak & Seas, PLLC

[57]            ABSTRACT

A pneumatic radial tire capable of effectively controlling the occurrence of wandering phenomenon when being used in vehicles such as passenger car, small-size truck, truck, bus and the like is provided, in which a second tread zone contacting with a mountain side of a slant road surface is arranged so as to project toward a side of a first tread zone contacting with a flat road surface and camber thrust of the radial tire is increased by the second tread zone during the running on ruts and the like under loading.

5 Claims, 12 Drawing Sheets

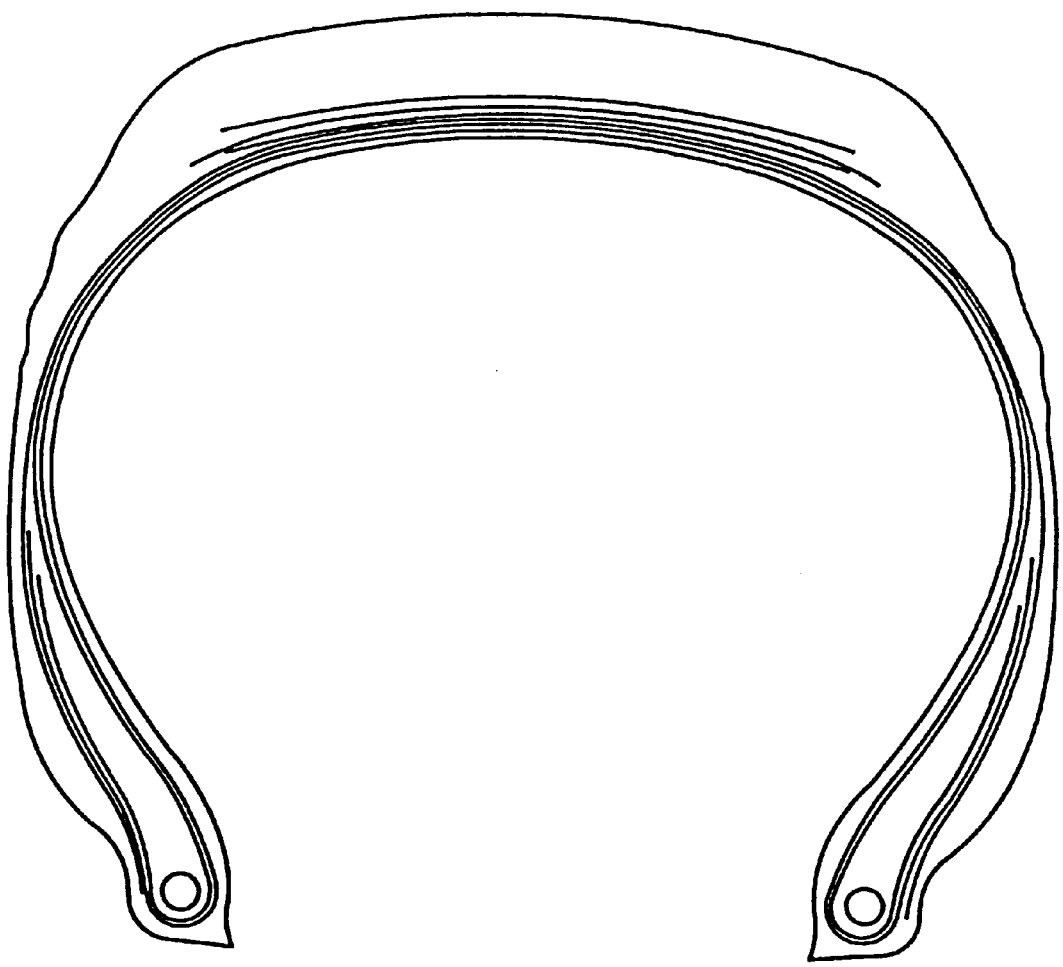
FIG_6
COMPARATIVE

FIG_8

FIG_10
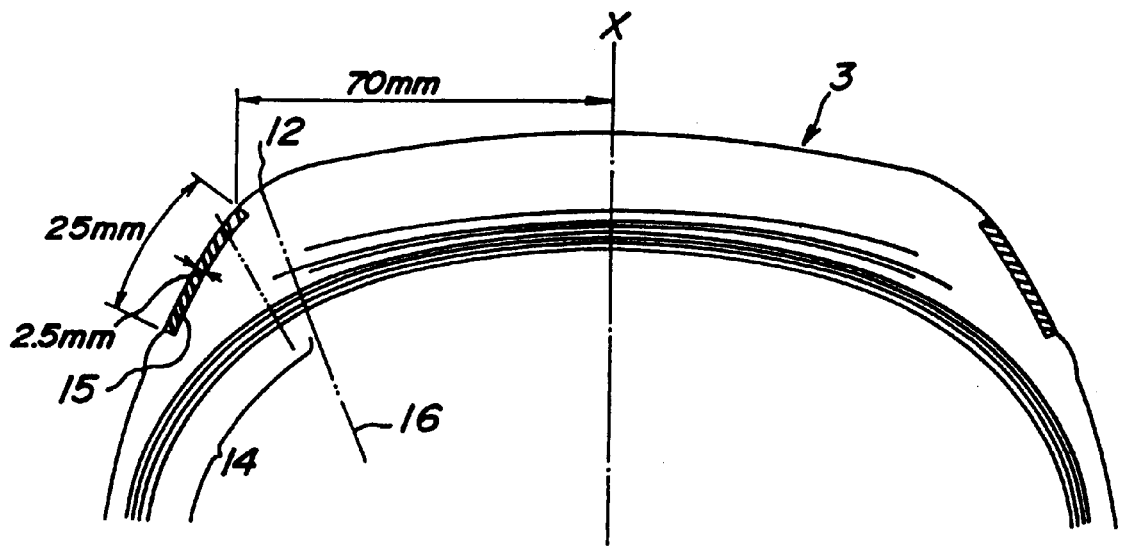
FIG_11
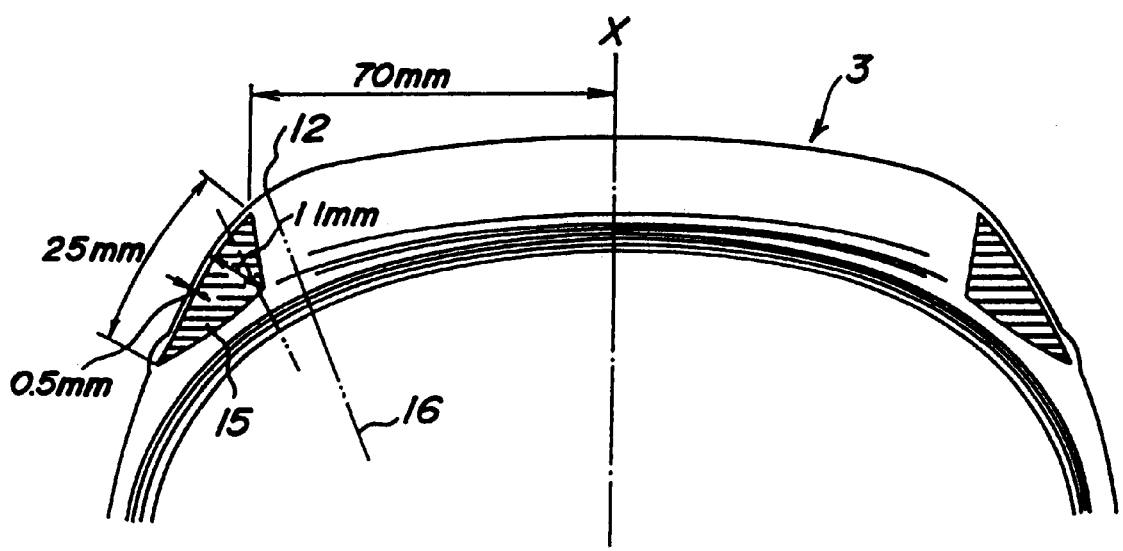

PNEUMATIC RADIAL TIRES WITH SPECIFIED PROFILE

This is a divisional of application Ser. No. 08/836,224 filed May 7, 1997, now U.S. Pat. No. 5,349,118 which is a 371 of PCT/JP96/01296 filed May 16, 1996.

TECHNICAL FIELD

This invention relates to a pneumatic radial tire effectively controlling a complicated motion of the tire exceeding over a driver's forecast or an occurrence of so-called wandering phenomenon to largely improve straight running stability when the tire is run on a slant face of an uneven road surface such as a rut or the like.

BACKGROUND ART

The radial tire is excellent in the wear resistance and steering stability because cords in a carcass ply are arranged to extend substantially in a direction perpendicular to an equatorial plane of the tire. Therefore, radial tires are frequently used as compared with bias tires in not only passenger cars but also vehicles such as small-size truck, truck and bus with a recent advance of the high-speed performance of those vehicles.

However, the high-speed running of the vehicles is daily carried out in accordance with the improvement and expansion of road systems and the like. For this end, it is strongly demanded to sufficiently control the wandering phenomenon liable to be caused in the radial tire rather than the bias tire to thereby enhance the straight running stability and more improve the safety.

Viewing the occurrence of wandering phenomenon in the radial tire, as shown in FIG. 1, when the tire T is rotated on a slant face S such as rut or the like, each of load W, reaction force $F_R$ from road surface and camber thrust $F_C$ is applied to the tire T and hence lateral force $F_Y$ as a resultant force of horizontal components of these forces acts thereto. The tire of radial structure is high in the treading rigidity as compared with the tire of bias structure, and also the rigidity of the tread portion is fairly higher than that of the side portion due to the structure of the radial tire. The camber thrust $F_C$ is made smaller than that of the tire of bias structure and hence lateral force $F_Y$ directing to a lower side of the slant face S becomes relatively large by a quantity corresponding to the reduced quantity of the camber thrust $F_C$. As a result, the tire T strongly tends to slip downward on the slant face and it is difficult to ride over a rut and hence the wandering phenomenon is caused.

As shown at radial section of the tire in FIG. 2, when the tire is rotated on the slant face S, the camber thrust FC is caused based on the fact that the tread portion $T_r$ tends to strongly contact with ground at an upper side or a mountain side of the slant face S and rise upward at a valley side of the slant face S, and particularly falling-down deformation of a region Bu in the vicinity of the buttress of the tire side portion or so-called bulging deformation bside toward the mountain side is caused at the mountain side due to the strong ground contact of the tread portion $T_r$ and such a bulging deformation bside brings about bending deformation of the tread portion $T_r$ near to a ground contact end or so-called pushing-out deformation $b_{sho}$, and such a pushing-out deformation $b_{sho}$ in a zone near to the ground contact end further gives shearing deformation $S_S$ as shown by dotted lines to the tread rubber in a portion near to the ground contact end, and such a shearing deformation creates a lateral force FCS directing to the upper side of the slant face S.

As regards the camber thrust $F_C$, in the bias tire having a small difference of rigidity among constitutional parts of the tire and a relatively soft structure, sufficiently large bulging deformation $b_{side}$ and pushing-out deformation bsho can be insured and hence the camber thrust $F_C$ created becomes large. Since the rigidity of the tread portion in the radial tire is considerably higher than the rigidity of the side portion, a tendency of creating escape deformation in a direction opposite to the above as exaggeratedly shown by a phantom line becomes strong in the tire side portion and hence the shearing deformation SS of the tread rubber becomes naturally small and it is obliged to reduce the camber thrust $F_C$.

In order to increase the camber thrust in the pneumatic radial tire, therefore, it is effective that the bulging deformation bside of the region Bu is made large and the transmission efficiency of the bulging deformation $b_{side}$ is enhanced to make large the pushing-out deformation $b_{sho}$ in the zone near to the ground contact end to thereby increase the shearing deformation $S_S$ of the tread rubber at the ground contact end portion. It is effective that the ground contact area of the tire to the slant face S is made large to increase a total amount of lateral force FCS directing to the upper side of the slant face S.

It is, therefore, an object of the invention to provide pneumatic radial tires sufficiently controlling the occurrence of wandering phenomenon on the slant face of the rut or the like to largely improve the straight running stability by increasing the camber thrust of the radial tire without degrading the properties inherent to the radial tire.

DISCLOSURE OF THE INVENTION

A first pneumatic radial tire according to the invention comprises a pair of bead portions, a pair of sidewall portions, a tread portion toroidally extending between both sidewall portions, a radial carcass reinforcing these portions and a belt reinforcing the tread portion at the outer circumferential side of the radial carcass, in which the tread portion is comprised of a first tread zone contacting with a flat road surface and a second tread zone projecting toward the side of the first tread zone and contacting with a mountain side of a slant road surface, and the first tread zone is a maximum width region of a ground contact portion of the tire on a flat road surface under a normal loading in case of truck and bus tire and under a loading corresponding to 70% of a normal loading in case of tires having a size smaller than that of the truck and bus tire at an inflation state under a normal air pressure in accordance with a maximum loading capacity according to JATMA standard, and the second tread zone is a region extending outward from the first tread zone in widthwise direction of a ground contact portion on the flat road surface when a camber angle of 10° is applied to the tire under a normal loading in case of truck and bus tire and under a loading corresponding to 70% of a normal loading in case of tires having a size smaller than that of the truck and bus tire at an inflation state under a normal air pressure in accordance with a maximum loading capacity according to JATMA standard.

In a preferable embodiment, a reinforcing portion projecting outward from the second tread zone in the widthwise direction is arranged. In a more preferable embodiment, an outer profile line of the reinforcing portion at radial section of the tire is located inward from a phantom extending line of an outer profile line of the second tread zone in the radial direction of the tire.

The reinforcing portion may be constructed with plural ribs arranged at given intervals in the circumferential direction of the tire, if necessary.

It is favorable that a tread width is within a range of 80–105% of a tire section width at an inflation state under a normal internal pressure, and it is favorable that a maximum width of the belt is within a range of 60–100% of the tire section width at the inflation state under a normal internal pressure.

In the first pneumatic radial tire, the tread portion is largely projected by a portion corresponding to the second tread zone in the widthwise direction of the tire as compared with the conventionally generic radial tire, so that the ground contact area of the tire during the running on the slant face as shown in FIG. 2 is made larger as compared with the conventional tire, whereby the total amount of lateral force $F_{CS}$ directing to the upper side of the slant face S can be increased.

Since the second tread zone projecting in the widthwise direction of the tire has a high rigidity as a part of the tread portion $T_r$, the escape deformation from the portion near to the ground contact end of the tread portion $T_r$ to the tire side portion as exaggeratedly shown by the phantom line in FIG. 2 is effectively prevented to increase the bulging deformation $b_{side}$. In addition, it is possible to transmit the pushing-out deformation bsho based on the bulging deformation $b_{side}$ to a wide range of the second tread zone contacting with the slant face S, whereby the shearing deformation $S_S$ of the tread portion Tr and hence camber thrust $F_C$ are effectively increased.

On the other hand, in the radial tire having no second tread zone, the position of the ground contact end can not be moved to the upper side of the slant face during the contact with the slant face of the rut or the like. Hence the ground contact pressure at the ground contact end portion and the neighborhood thereof largely rises and also the rigidity ranging from the ground contact end portion to the tire side portion is low, and it is obliged to cause the escape deformation as shown in FIG. 2

Therefore, the tire having the second tread zone is a tire of radial structure and can effectively enhance lateral force $F_{CS}$ and hence camber thrust $F_C$.

Even in the conventional radial tire, if there is a shoulder shape such as round shoulder, taper shoulder or the like, when a camber angle of 10° is applied to the tire, a side region of the tread portion may contact with ground at a width of not more than about 5 mm. However, such a ground contact region is not a ground contacting portion of the tread having a high rigidity, so that it is impossible to bring about the effect aiming at the invention.

In case of arranging the reinforcing portion so as to push outward from the second tread zone in the widthwise direction, such a reinforcing portion ensures the bulging deformation $b_{side}$ of a portion near to the buttress and can effectively increase the bulging deformation $b_{side}$, and as a result, the pushing-out deformation $b_{side}$ of a portion near to the ground contact end and the shearing deformation $S_S$ of tread rubber are increased.

Moreover, when the outer profile line of this reinforcing portion in meridional section of the tire is located inside a phantom extension line of the outer profile of the second tread zone, the functions inherent to the reinforcing portion can sufficiently be developed without the increase of extra weight while ensuring a sufficient ground contact width to the slant face S.

In this tire, when the tread width is within a range of 80–105% of a tire section width, a fear of breaking the tread end can sufficiently be removed while sufficiently securing the increase of camber thrust $F_C$. Further, when the maximum width of the belt is within a range of 60–100% of the tire section width, the above bulging deformation $b_{side}$ is effectively transferred to the neighborhood of the ground contact end and also the occurrence of so-called belt end separation can effectively be prevented.

A second pneumatic radial tire according to the invention comprises a tread portion comprised of a first tread zone contacting with a flat road surface and a second tread zone projecting toward the side of the first tread zone and contacting with a mountain side of a slant road surface, in which a half width ($TW_1$) of the first tread zone is a maximum ground contact width in a ground contact portion of the tire on the flat road surface from an equatorial plane of the tire under a normal loading in case of truck and bus tire and under a loading corresponding to 70% of a normal loading in case of tires having a size smaller than that of the truck and bus tire at an inflation state under a normal air pressure in accordance with the maximum loading capacity, and a width ($TW_2$) of the second tread zone satisfies the following condition:

$TW_2/TW_1 > 4.0 \times 10^{-2}$ when this width is a ground contact width extending outward from the half-width ($TW_1$) of the first tread zone among the maximum ground contact width in the ground contact portion of the tire on the flat road surface from the equatorial plane of the tire when a camber angle of 10° is applied to the tire under a normal loading in case of truck and bus tire and under a loading corresponding to 70% of a normal loading in case of tires having a size smaller than that of the truck and bus tire at an inflation state under a normal air pressure in accordance with a maximum loading capacity, and a distance (b) from a side edge of the first tread zone to an outer profile line of the tire at a position corresponding to 0.95 times a height (H) of the carcass from the bead core at a state of inflating under an air pressure corresponding to 10% of a normal air pressure satisfies the following condition with respect to the width ($TW_2$) of the second tread zone:

$b/TW_2 > 1.2$.

Moreover, the term "carcass height" used in the specification and claims means a height from the bead core to an innermost carcass ply when there are existent plural carcass plies.

In such a tire, it is preferable that a total tire thickness of a middle part in the tire side portion locating within a range of 0.5–0.8 times the carcass height (H) from the bead core at the meridional section of the tire in a normal direction of the radial carcass is thinner than a total tire thickness of the other part in the tire side portion, and that a maximum width position of the radial carcass is located within a range of 0.6–0.8 times the carcass height (H) from the bead core.

Furthermore, it is favorable that the total tire thicknesses of the tire side portion in the normal direction of the radial tire at positions of 0.85 times and 0.4 times the carcass height (H) from the bead core at the meridional section of the tire are thicknesses exceeding 1.65 times the similar total tire thickness at the maximum width position of the carcass.

And also, it is favorable that a width of the tread at a state of inflating under an air pressure corresponding to 10% of the normal air pressure is within a range of 80–95% of the tire section width, and that a maximum width of the belt at a state of inflating under an air pressure corresponding to 10% of the normal air pressure is within a range of 60–90% of the tire section width.

In such a pneumatic radial tire, when the interrelation of the half-width of the first tread zone ($TW_1$) and the width of the second tread zone ($TW_2$) are $TW_2/TW_1 > 4.0 \times 10^{-2}$, the effective increase of camber thrust $F_C$ can be particularly ensured while sufficiently maintaining the ground contact width of the second tread zone when the tire is rotated on the slant face such as rut or the like, while when the interrelation of the distance (b) from the side edge of the first tread zone to the outer profile of the tire and the width of the second tread zone ($TW_2$) is $b/TW_2 > 1.2$, the escape deformation of the buttress and the second tread zone as shown by a phantom line in FIG. 2 is restrained, while the pushing-out deformation bsho accompanied with the bulging deformation $b_{side}$ of the second tread zone is increased to enhance the rigidity of the second tread zone and hence a large shearing force to the road surface is generated in the contact of the second tread zone with ground, whereby the effective increase of camber thrust $F_C$ can be realized.

In a third pneumatic radial tire according to the invention, a high-hardness rubber layer having a JIS A-hardness higher by 3 degrees or more than rubber hardness of a tread rubber is arranged in a region at the meridional section of the tire including an outermost position of ground contact end at the meridional section of the tire under a normal loading in case of truck and bus tire and under a loading corresponding to 70% of a normal loading in case of tires having a size smaller than that of the truck and bus tire at an inflation state under a normal air pressure in accordance with the maximum loading capacity and a position measured from the bead core to ½ point of the carcass height from the bead core under an inflation of the above normal air pressure.

In this tire, it is favorable that a surface of the high-hardness rubber layer at least facing an inner periphery side of the tire at the meridional section of the tire is rendered into a wavy form. An average wavelength of the waved portion is not more than ⅓ of a total extension of the waved portion and more particularly the total extension of the waved portion is longer by not less than 20% than a length of a line segment passing through a middle point of the wave.

Furthermore, it is favorable that a thickness center of a maximum thickness in the high-hardness rubber layer as measured in a normal direction of the radial carcass at the meridional section of the tire under the inflation of the above normal air pressure is located outward toward the outer surface of the tire from a thickness center of a total tire thickness as measured on a normal line passing through the above maximum thickness position.

In such a pneumatic radial tire, the high-hardness rubber layer embedded in the region near to the buttress enhances the transmission efficiency of the bulging deformation bside at this region to a part in the vicinity of the ground contact end to thereby increase the pushing-out deformation $b_{sho}$ but also contributes to increase the shearing force of the tread rubber to the road surface, and hence the camber thrust $F_C$ is increased.

When the surface of the high-hardness rubber layer at least facing the inner periphery side of the tire is made wavy at the meridional section of the tire, the adhesion strength of the high-hardness rubber layer to adjacent rubber layer is increased. Thus, a fear of peeling off the high-hardness rubber layer can sufficiently be removed.

In a fourth pneumatic radial tire according to the invention, a thinned portion is formed in at least a part of the side portion locating within a range of 0.5–0.8 times the carcass height (H) from the bead core at a state of inflating under an air pressure corresponding to 10% of the normal air pressure in accordance with the maximum loading capacity so that a minimum total tire thickness of this thinned portion as measured in the normal direction of the radial carcass at the meridional direction of the tire is not more than 75% of a similarly measured minimum total tire thickness of the tire side portion located outside this range.

It is favorable that a position of the maximum width of the radial carcass is located within a range of 0.6–0.8 times the carcass height (H) from the bead core, and that not less than 80% of a portion having a maximum curvature of the radial carcass at the meridional section of the tire is located within a range of 0.65–0.85 times the carcass height (H) from the bead core.

And also, it is favorable that the total tire thickness at the meridional section of the tire as measured in the normal direction of the radial carcass at a position corresponding to 0.85 times the carcass height (H) from the bead core is not less than 0.64 times the similar total tire thickness at a position of side edge of the belt. A thickened portion is formed in at least a part of the side portion locating within a range of 0.8–0.85 times the carcass height (H) from the bead core so that the total tire thickness of this thickened portion is not less than 1.5 times the similar total tire thickness at a position corresponding to 0.75 times the carcass height (H) from the bead core.

According to this pneumatic radial tire, the total tire thickness of the thinned portion located within a range of 0.5–0.8 times the carcass height (H) becomes particularly thinner as compared with the other part of the tire side portion and the bending rigidity of the thinned portion locally lowers. As a result, the bending deformation concentrates in this portion during the running of the tire on the slant face to increase the bulging deformation $b_{side}$ of a portion near to the buttress and hence the pushing-out deformation $b_{sho}$ of a portion in the vicinity of the ground contact end becomes large and the camber thrust $F_C$ is effectively increased.

BRIEF DESCRIPTION OF THE DRAWINGS

FIG. 6 is a meridional section view of a comparative tire having no second tread zone.

FIG. 10 is a section view of a main part illustrating an arrangement of a high-hardness rubber layer.

FIG. 11 is a section view of a main part illustrating another arrangement of a high-hardness rubber layer.

DESCRIPTION OF THE PREFERRED EMBODIMENTS

Figure 3:
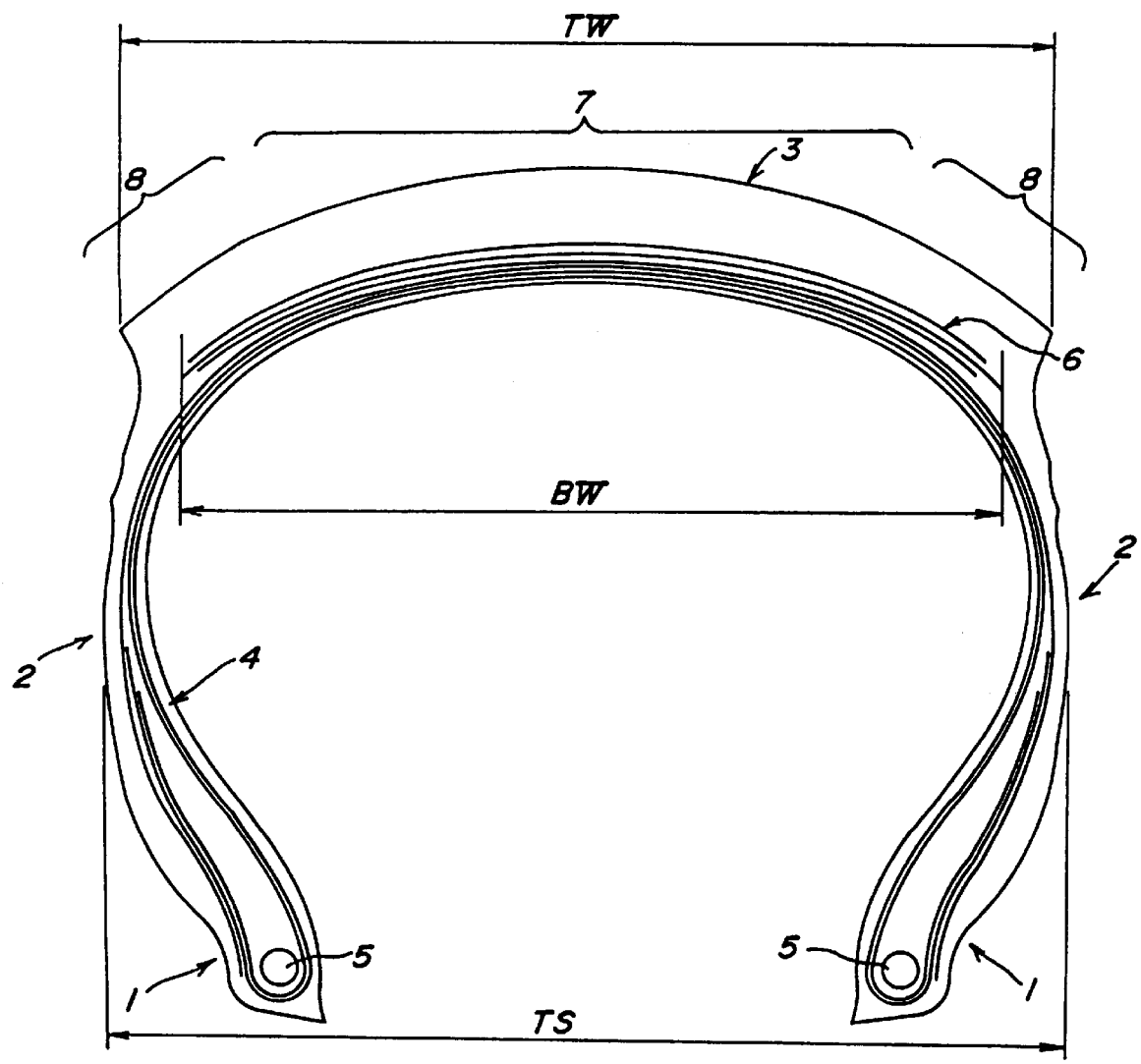
FIG. 3 is a meridional section view of a first pneumatic radial tire according to the invention.

In FIG. 3 showing a meridional section of a first pneumatic radial tire, 1, 2 are a pair of bead portions and a pair of sidewall portions, respectively, and 3 a tread portion toroidally extending between the sidewall portions.

The word "tire side portion" or "side portion" used in the specification and claims includes the bead portion 1 and the sidewall portion 2, respectively.

In this figure a radial carcass 4 continuously extending from one bead portion 1 to the other bead portion 1. In this case, the radial carcass 4 is comprised of two plies wound at their side portions around a bead core 5 embedded in the bead portion 1 from inside toward outside and one so-called down ply, and reinforces the above portions 1, 2, 3.

A belt 6 is arranged on an outer periphery side of a crown portion of the radial carcass 4 to reinforce the tread portion 3. The illustrated belt 6 is comprised of three belt layers, among which a middle layer has a widest width.

In this tire, the tread portion 3 is comprised of a first tread zone 7 contacting with flat road surface during the running of the tire under loading and a second tread zone 8 projecting toward the side of the first tread zone 7 and contacting with a mountain side of a slant road surface.

In this case, the first tread zone 7 is concretely a maximum width region of a ground contact portion of the tire on a flat road surface under a normal loading in case of truck and bus tire and under a loading corresponding to 70% of a normal loading in case of tires having a size smaller than that of the truck and bus tire at an inflation state under a normal air pressure in accordance with a maximum loading capacity according to JATMA standard.

The loading condition used herein is determined by considering the magnification and frequency of load actually applied to the tire, and is based on the fact that a maximum load is frequently loaded in truck and bus and a load corresponding to about 70% of the maximum load is loaded in vehicles other than the above.

Furthermore, the second tread zone is a region extending outward from the first tread zone in widthwise direction of a ground contact portion on the flat road surface when a camber angle of 10° is applied to the tire under the respective loading condition in truck and bus tire and tires other than the above at the inflation state under the above normal air pressure.

The reason why the camber angle of 10° is given to each of the tires is based on the knowledge that when examining the tire behavior during the running on a rut in detail, the deformation state on the slant face of the rut is substantially the same as that in the application of camber angle of 10° to the tire.

Figure 4:
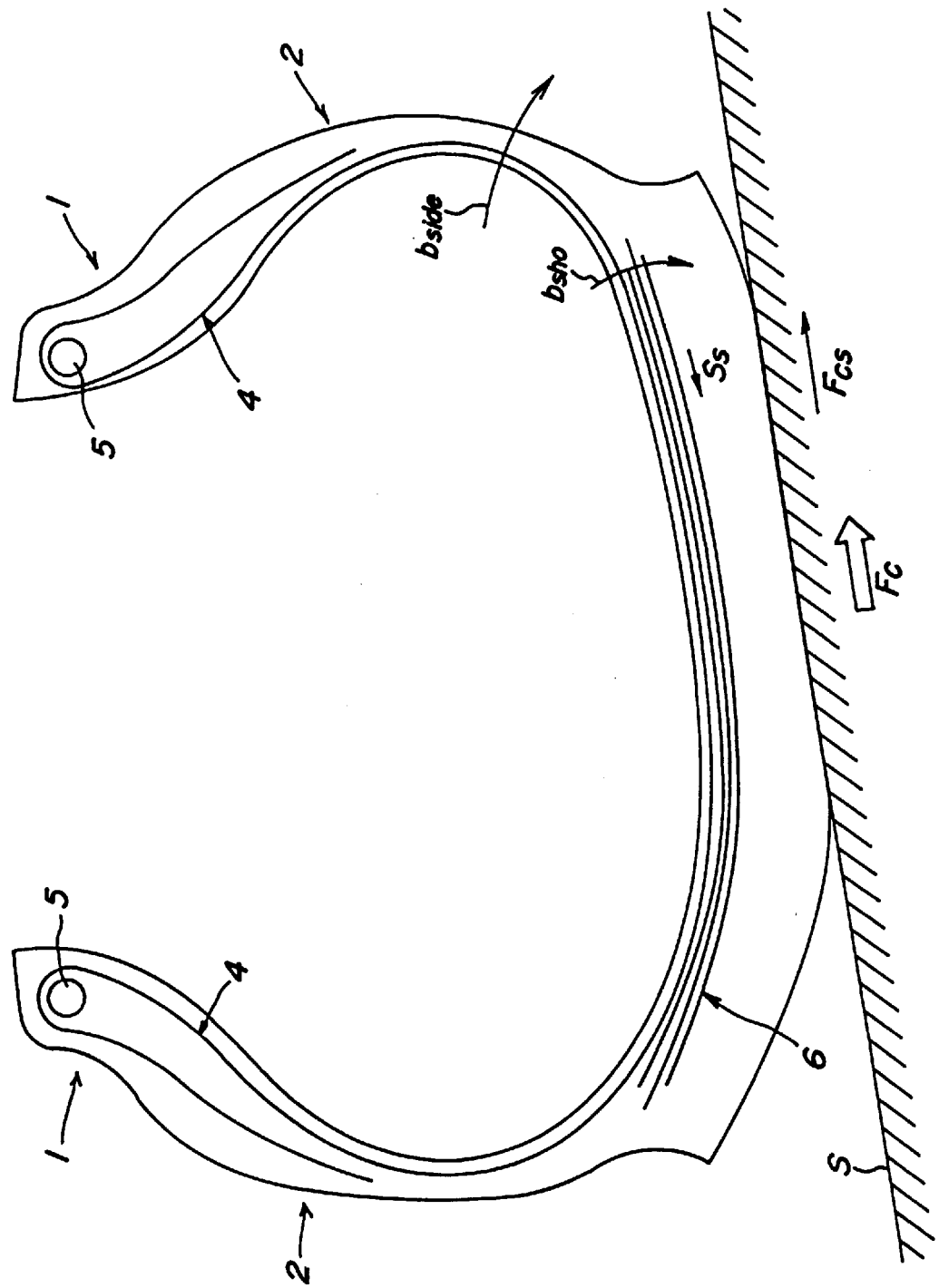
FIG. 4 is a schematically section view illustrating a state of generating camber thrust in the tire of FIG. 3.

When the tire having such a structure is run on a slant face S under loading as shown in FIG. 4, the ground contact area can be increased by a region of ground contact width of the second tread zone 8 owing to the presence thereof as compared with the conventional radial tire, whereby lateral force $F_{CS}$ directing toward upper side of the slant face S and hence camber thrust $F_C$ can directly be increased.

Further, the second tread zone 8 of high rigidity not only prevents the escape deformation of a portion near to the buttress but also positively contributes to the increase of the pushing-out deformation of a portion near to the ground contact end as previously mentioned, from which point the effective increase of camber thrust $F_C$ can also be realized.

In this case, it is preferable that the radius of curvature of the second tread zone 8 is not less than 40 mm at a section shown in FIG. 3 for ensuring the sufficient ground contacting property of this zone.

Figure 5A:
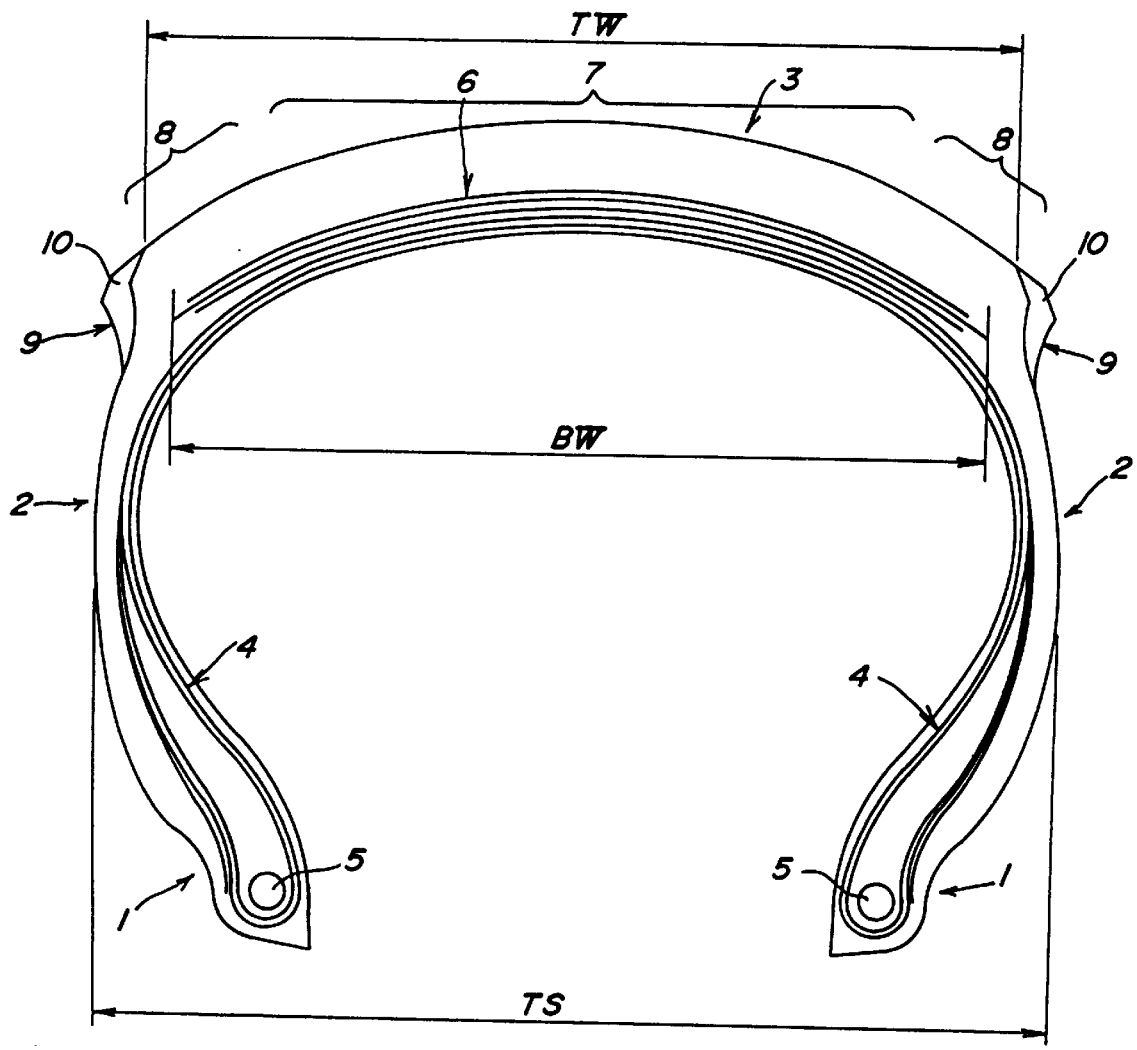
FIG. 5 is a schematic view illustrating another embodiment of the first pneumatic radial tire.
Figure 5B:
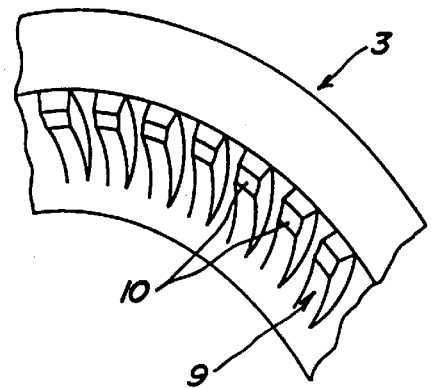

In FIG. 5, a reinforcing portion 9 projecting outward from the second tread zone 8 in the widthwise direction is arranged in the aforementioned tire, whereby the strength and rigidity in the second tread zone 8 and buttress portion are increased.

The outer profile line of the reinforcing portion 9, preferably at the meridional section of the tire, is located inward from a phantom extending line of the outer profile line of the second tread zone 8 in the radial direction of the tire, whereby the contact of the reinforcing portion 9 with ground is prevented during the running of the tire on the slant face S under loading.

Furthermore, the projection quantity of the reinforcing portion 9 toward the side of the tread portion can be determined by considering durability to heat generation, weight, cost and the like required for satisfying the running conditions, and easiness of mounting a tire chain on snow road. The projection quantity is gradually decreased inward in the radial direction of the tire and disappears at an upper end of the sidewall portion 2.

Such a reinforcing portion 9 brings about the increase of the bulging deformation $b_{side}$ under the improved reinforcing action and can effectively contribute to the more increase of the camber thrust $F_C$.

Moreover, when the reinforcing portion 9 is annually and continuously arranged in the circumferential direction of the tire, or when it is arranged at slight intervals through slits having a narrow width or the like in the circumferential direction, the functions inherent thereto can effectively be developed.

On the other hand, in order to effectively control the increase of tire weight while maintaining the reinforcing effect through the reinforcing portion 9, as shown in FIG. 5, it is favorable that the reinforcing portion 9 is constructed with a plurality of ribs 10 arranged at relatively large intervals in the circumferential direction of the tire.

In the pneumatic radial tire, of the first preferred embodiment, it is further preferable that the tread width TW is within a range of 80–105% of the tire section width TS under the inflation of the above normal air pressure, and that the maximum width of belt BW is within a range of 60–100% of the tire section width TS.

In other words, when the tread width TW is less than 80% of the tire section width TS, there is caused a fear that the camber thrust FC can not sufficiently be increased, while when it exceeds 105%, the increase of camber thrust $F_C$ reaches to limit and a fear of breaking the tread end becomes higher. Further, when the belt maximum width BW is less than 60% of the tire section width TS, there is caused a fear of damaging the effective transmission of the bulging deformation $b_{side}$ of a portion in the vicinity of buttress to a portion near to the ground contact end. When it exceeds 100%, the increase of camber thrust $F_C$ reaches to limit and also it is apt to cause separation at belt end portion.

A comparison test relating to the effect of controlling the wandering phenomenon in the pneumatic radial tire of the above structure will be described below.

Test Tire

Various radial tires for small-size truck having the structure shown in FIG. 3 and a tire size of 195/85R16 114/112L LT are manufactured by varying the tread width and belt maximum width under dimensions shown in Table 1 as invention tires 1–3. In these tires, the tire section width TS is 191 mm, and the outer profile line of the tread portion is comprised of an arc having a radius of curvature of 300 mm over a region outward from the equatorial plane of the tire to 37.6 mm in the widthwise direction of the tire, an arc having a radius of curvature of 100 mm over a region outward from the equatorial plane of the tire to 37.6–80.0 mm in the widthwise direction of the tire and an arc having a radius of curvature of 50 mm over an outermost region in the widthwise direction of the tire.

In this case, the first tread zone 7 is existent in a region outward from the equatorial plane of the tire to each side of 62.5 mm in the widthwise direction of the tire, and the second tread zone 8 is existent outward from the first tread zone 7 in the widthwise direction.

Further, the reinforcing portion 9 as shown in FIG. 5 is arranged to tires having the same structure as mentioned above as invention tires 4 and 5. In this case, each of the ribs 10 constituting the reinforcing portion 9 taperingly projects outward from a side edge of the second tread zone 8 to 10 mm in the widthwise direction of the tire, and the projection quantity gradually decreases inward in the radial direction of the tire and disappears on the upper end portion of the sidewall portion 2. The rib 10 has a width of 20 mm in the circumferential direction of the tire. These ribs 10 are arranged at an interval of 16 mm in the circumferential direction in a total number of 64 on the circumference.

As a comparative tire, there is prepared a tire having the structure shown in FIG. 6. This comparative tire differs from the tire shown in FIG. 3 in only a point that the second tread zone 8 is not existent.

Test Method

Each of these tires is inflated under a normal air pressure of 6.0 kgf/cm$^2$ and mounted onto a small-size truck of 2 ton capacity (rear wheel is double-wheel type). The small-size truck is run on a paved road including ruts at a state of loading under a maximum authorized payload by a test driver, during which a straight running stability is feelingly evaluated.

The results are also shown in Table 1 by an index evaluation that the comparative tire is 100 (the larger the index value, the better the property).

As seen from this table, the tires according to the invention effectively prevent the wandering phenomenon and can largely improve the straight running stability.

TABLE 1

| Tire | Tread width Tw (mm) | Belt maximum width BW (mm) | Tire section width TS (mm) | Reinforcing portion | Straight running stability | Remarks |
|---|---|---|---|---|---|---|
| Comparative tire | 125 (0.66) | 125 (0.66) | 189 | none | 100 | FIG. 6 |
| Invention tire 1 | 180 (0.95) | 125 (0.66) | 189 | none | 124 | FIG. 3 |
| Invention tire 2 | 180 (0.95) | 162 (0.86) | 189 | none | 137 | FIG. 3 |
| Invention tire 3 | 192 (1.02) | 162 (0.86) | 189 | none | 142 | FIG. 3 |
| Invention tire 4 | 180 (0.95) | 162 (0.86) | 189 | presence | 139 | FIG. 5 |
| Invention tire 5 | 192 (1.02) | 162 (0.86) | 189 | presence | 145 | FIG. 5 |

Note)
Numerical value in parenthesis of tread width and belt maximum width is a ratio to tire section width.

The second preferred embodiment of a pneumatic radial tire according to the invention will be described with reference to FIG. 7. In this case, a solid line indicates the invention tire, and broken lines indicate the conventional tire. Moreover, explanations are omitted with respect to the same structural portions as described in the first pneumatic radial tire.

In this tire, an interrelation between a half-width $TW_1$ of the first tread zone 7 and a width $TW_2$ of the second tread zone 8, that is, the interrelation between the half-width ($TW_1$) of the first tread zone as a maximum ground contact width in a ground contact portion of the tire on the flat road surface from an equatorial plane of the tire under a normal loading in case of truck and bus tire and under a loading corresponding to 70% of a normal loading in case of tires having a size smaller than that of the truck and bus tire at an inflation state under a normal air pressure in accordance with the maximum loading capacity. The width ($TW_2$) of the second tread zone as a ground contact width extending outward from the half-width ($TW_1$) of the first tread zone among the maximum ground contact width in the ground contact portion of the tire on the flat road surface from the equatorial plane of the tire when a camber angle of 10° is applied to the tire under a normal loading in case of truck and bus tire and under a loading corresponding to 70% of a normal loading in case of tires having a size smaller than that of the truck and bus tire at the inflation state under the above normal air pressure and $TW_2/TW_1 > 4.0 \times 10^{-2}$.

In addition, an interrelation between the width TW2 of the second tread zone and a distance (b) between points P, Q when an intersect between a phantom line segment drawn from the bead core 5 to a height position corresponding to 0.95 times a carcass height H, which is a height H from the bead core 5 to an innermost carcass ply at the inflation under an air pressure corresponding to 10% of the above normal air pressure, with a normal line drawn from a side edge of the first tread zone 7 to the phantom line segment is P and an intersect of the phantom line segment with the outer profile line of the tire is Q is $b/TW_2 > 1.2$.

The illustrated tire satisfying the above conditions can develop functions similar to those of the above first embodiment of a pneumatic radial tire under each action of the first tread zone 7 and the second tread zone 8 constituting the tread portion 3.

When the width $TW_2$ of the second tread zone 8 is not more than $4.0 \times 10^{-2}$ to the half-width $TW_1$ of the first tread zone 7, the ground contact width of the second tread zone can not sufficiently be ensured during the running of the tire on the slant face under loading and hence the required increase of camber thrust $F_C$ can not be obtained.

Observing the deformation behavior of the second tread zone 8 during the running of the tire on the slant face, it is usually effective to increase the rigidity of a portion in the vicinity of the point P in order to create a large pushing-out deformation $b_{sho}$ based on the bulging deformation bside. As a result, the buttress portion can directly be reinforced and also the second tread zone 8 can indirectly and effectively be reinforced by sufficiently making large rubber thickness of a portion outward from the point P in the axial direction of the tire to render the ratio of rubber thickness b to width $TW_2$ of the second tread zone 8 into more than 1.2. Consequently the pushing-out deformation $b_{sho}$ of the second tread zone 8 is effectively increased and also a large shearing force to road surface is created in the ground contact portion of the second tread zone 8, whereby camber thrust $F_C$ can largely be increased.

In other words, when the ratio is less than 1.2, the reinforcing effect is low and it is difficult to create the large pushing-out deformation $b_{sho}$ resulted from the bulging deformation $b_{side}$.

This is particularly effective when a reinforcing portion 11 further projecting from a tread end or a side edge of the second tread zone 8 is defined in the outer profile line of the tire passing the point Q as shown, in which the reinforcing portion 11 itself functions likewise the reinforcing portion 9 described on the first pneumatic radial tire and can effectively contribute to the increase of camber thrust $F_C$.

In such a tire, it is favorable that a total tire thickness of a middle part in the tire side portion locating within a range of 0.5–0.8 times the carcass height H from the bead core 5 at the meridional section of the tire in a normal direction of the radial carcass is thinner than a total tire thickness of the other part in the tire side portion. A maximum width position of the radial carcass is located within a range of 0.6–0.8 times the carcass height H.

According to the former case, when the thickness of the middle part in the tire side portion is made smaller than the thickness of each of the buttress portion and the bead portion, not only the increase of the pushing-out deformation $b_{sho}$ can be ensured while maintaining the buttress portion at a high rigidity, but also the rigidity of the middle part is made small to concentrate the bulging deformation $b_{side}$ of a portion near to the buttress and the bulging deformation $b_{side}$ can also be increased, and they can effectively contribute to the increase of camber thrust $F_C$.

This is particularly remarkable when each total tire thickness at positions corresponding to 0.85 times and 0.4 times the carcass height H from the bead core 5 exceeds 1.65 times the total tire thickness at the position of carcass maximum width. In other words, when it is not more than 1.65 times, it is difficult to sufficiently increase the bulging deformation $b_{side}$.

Moreover, the reason why the positions corresponding to 0.85 times and 0.4 times the carcass height H are specified is based on the knowledge that in order to conduct the concentration of deformation into the middle part located within a range of 0.5–0.8 times the carcass height H, it is advantageous to sufficiently thin a portion of this range, particularly the position of carcass maximum width with respect to portions at the positions of 0.85H and 0.4H outside the above range.

In the latter case, when the position of carcass maximum width is specified within a range of 0.6H–0.8H, it is possible to increase the bulging deformation $b_{side}$ during the running of the tire on the slant face under loading by making small the radius of curvature of the carcass ranging from the tread end portion to the buttress region and also it is possible to increase the pushing-out deformation bsho by approaching the position of creating the bulging deformation bside toward the buttress region. In addition, carcass tension upon inflation under the air pressure is made small within this range, so that the more increase of the bulging deformation at this range can be ensured.

In such a tire, it is further favorable that the tread width at the inflation under an air pressure corresponding to 10% of the normal air pressure is within a range of 80–95% of the tire section width, and that the belt maximum width is within a range of 60–90% of the tire section width.

This can realize the direct increase of camber thrust $F_C$ and the increase of bulging deformation bside likewise the first embodiment of the pneumatic radial tire.

When the tread width exceeds 95% of the tire section width, a fear of lowering the durability to heat generation due to the increase of rubber thickness at the end portion of the belt becomes higher, while when the belt maximum width exceeds 90% of the tire section width, a fear of lowering the belt durability and the durability to heat generation accompanied with the increase of strain in the end portion of the belt becomes higher.

Moreover, in order to sufficiently contact the second tread zone 8 with ground in this tire, it is preferable that the radius of curvature of the outer profile line at the meridional section of the tire is not less than 30 mm. Also, the reinforcing portion 11 may be comprised of annular projection continuously extending in the circumferential direction of the tire, or plural ribs likewise the first pneumatic radial tire.

Figure 7:
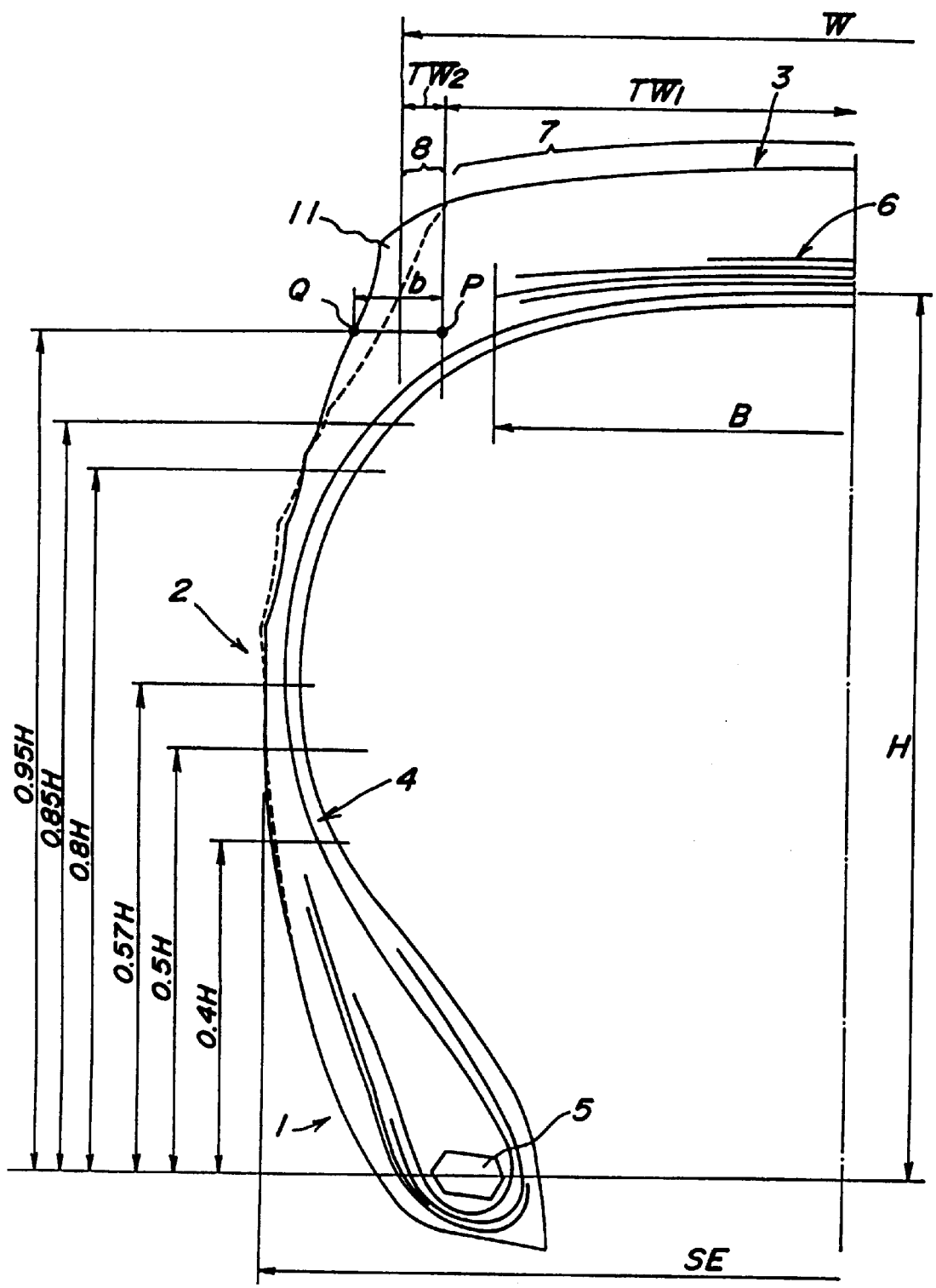
FIG. 7 is a meridional section view of a half portion of a second pneumatic radial tire.
Figure 8:
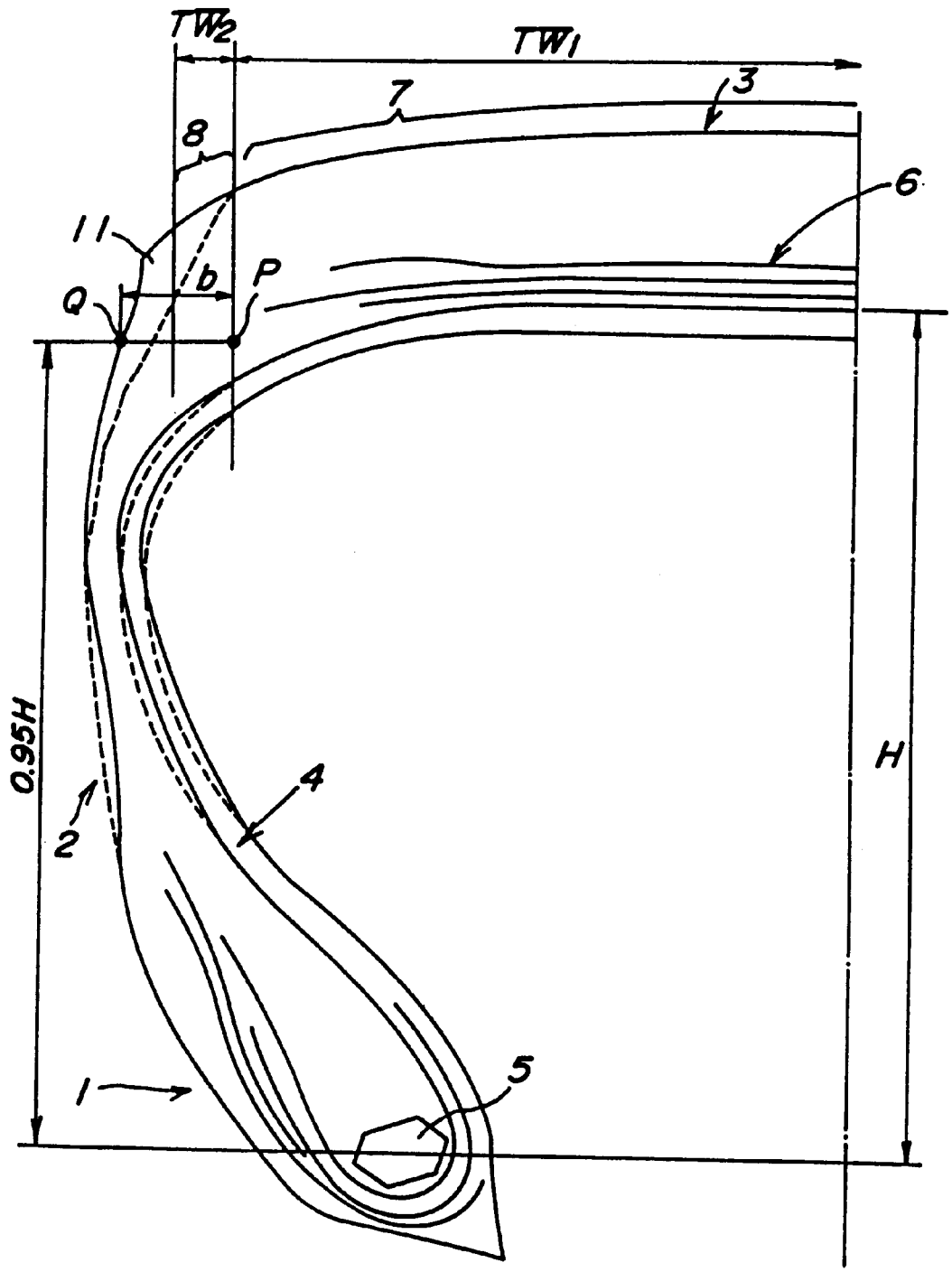
FIG. 8 is a section view of the second pneumatic radial tire similar to FIG. 7.

Although the practical embodiment of the second embodiment of a pneumatic radial tire is described with respect to a tire shown in FIG. 7 having a tire size of TBR 11R 22.5 14 PR, the above features are similarly applied to a tire shown in FIG. 8 having a tire size of TBR 215/70 R17.5. In this case, a solid line indicates the invention tire, and broken lines indicate the conventional tire.

The invention tire shown in FIG. 7 has $TW_1 \times 2 = 185.0$ mm, $TW_2 = 9.6$ mm, $b = 19.7$ mm, $b/TW_2 = 2.05$, $TW_2/TW_1 = 10.83 \times 10^{-2}$, while the conventional tire shown in the same figure has $TW_1 \times 2 = 185.0$ mm, $TW_2 = 0.0$ mm, $= 15.5$ mm.

Further, the invention tire shown in FIG. 8 has $TW_1 \times 2 = 167.0$ mm, $TW_2 = 8.0$ mm, $b = 15.4$ mm, $b/TW_2 = 1.93$, $TW_2/TW_1 = 9.58 \times 10^{-2}$, while the conventional tire shown in the same figure has $TW_1 \times 2 = 167.0$ mm, $TW_2 = 0.0$ mm, $b = 12.1$ mm.

A comparison test between the invention tire and the conventional tire shown in FIG. 7 will be described with respect to the performance of controlling the wandering phenomenon below.

Test Tire

There are provided invention tires 6–9 and conventional tire having a tire size of 11R22.5 14PR and dimensions shown in Table 2.

In the invention tires, the outer profile line of the tread portion is comprised of an arc having a radius of curvature of 580 mm outward from the equatorial plane of the tire to 62.8 mm in the widthwise direction of the tire, an arc having a radius of curvature of 200 mm outward from the equatorial plane of the tire to 62.8–91.5 mm in the widthwise direction of the tire, and an arc having a radius of curvature of 200 mm outward therefrom in the widthwise direction of the tire.

In this case, the first tread zone 7 is existent in a region outward from the equatorial plane of the tire to each side of 92.5 mm in the widthwise direction of the tire, while the second tread zone 8 is existent outward from the first tread zone 7 in the widthwise direction.

Moreover, the conventional tire has no second tread zone because the tread portion is comprised of only the first tread zone.

Test Method

Each of these tires is mounted onto a rim of 7.50×22.5, inflated under a normal air pressure of 7.0 kgf/cm² and then mounted onto a usual truck of 11.5 t capacity (wheel arrangement 2-D·4). The truck is run on a paved road including ruts at a state of loading under a maximum authorized payload by a test driver, during which a straight running stability is feelingly evaluated.

The results are also shown in Table 2 by an index evaluation that the conventional tire is 100 (the larger the index value, the better the property).

As seen from this table, the tires according to the invention can largely improve the straight running stability.

reason why the rubber hardness of the high-hardness rubber layer 15 is made higher than that of the tread rubber by 3

TABLE 2

| Tire | Thread width W (mm) | Tire section width Se (mm) | Belt maximum width W (mm) | Second tread zone and reinforcing portion | Thickness at H85/Thickness at position of carcass maximum width | Thickness at H40/Thickness at position of carcass maximum width | Position of carcass maximum width | Index of straight running stability |
|---|---|---|---|---|---|---|---|---|
| Conventional tire | 185.0 (W/SE = 0.65) | 265.0 | 156.0 (B/SE = 0.59) | none | 13.2/8.7 = 1.52 | 13.2/8.7 = 1.52 | H × 0.57 | 100 |
| Invention tire 6 | 214.0 (W/SE = 0.81) | 263.0 | 156.0 (B/SE = 0.59) | presence | 14.2/8.7 = 1.63 | 14.2/8.7 = 1.63 | H × 0.57 | 127 |
| Invention tire 7 | 214.0 (W/SE = 0.81) | 263.0 | 156.0 (B/SE = 0.59) | presence | 15.6/8.2 = 1.90 | 14.6/8.2 = 1.78 | H × 0.57 | 145 |
| Invention tire 8 | 214.0 (WISE = 0.81) | 263.0 | 156.0 (B/SE = 0.59) | presence | 15.6/8.2 = 1.90 | 14.6/8.2 = 1.78 | H × 0.65 | 151 |
| Invention tire 9 | 214.0 (WISE = 0.81) | 263.0 | 170.0 (B/SE = 0.65) | presence | 15.6/8.2 = 1.90 | 14.6/8.2 = 1.78 | H × 0.65 | 163 |

Note) Thickness at H85 and thickness at H40 indicate tire thicknesses at positions corresponding to 0.85 times and 0.40 times the carcass height H, respectively.

A practical embodiment of the third embodiment of a pneumatic radial tire according to the invention will be described with reference to FIG. 9 below.

In this case, explanations are omitted with respect to the same portions as described in the first pneumatic radial tire.

In this radial tire, a high-hardness rubber layer 15 having a JIS A-hardness higher by 3 degrees or more, preferably 5 degree or more that that of tread rubber is arranged in a region 14 shown by oblique lines in the same figure at the meridional section of the tire ranging from a position 12 of an outermost ground contact end in the meridional section of the tire under a normal loading in case of truck and bus tire and under a loading corresponding to 70% of a normal loading in case of tires having a size smaller than that of the truck and bus tire at an inflation state under a normal air pressure in accordance with the maximum loading capacity to a point 13 corresponding to ½ of a carcass height $H_0$ from the bead core as the carcass height $H_0$ from bead core under the inflation of the above normal air pressure and including both positions 12, 13.

Figure 9:
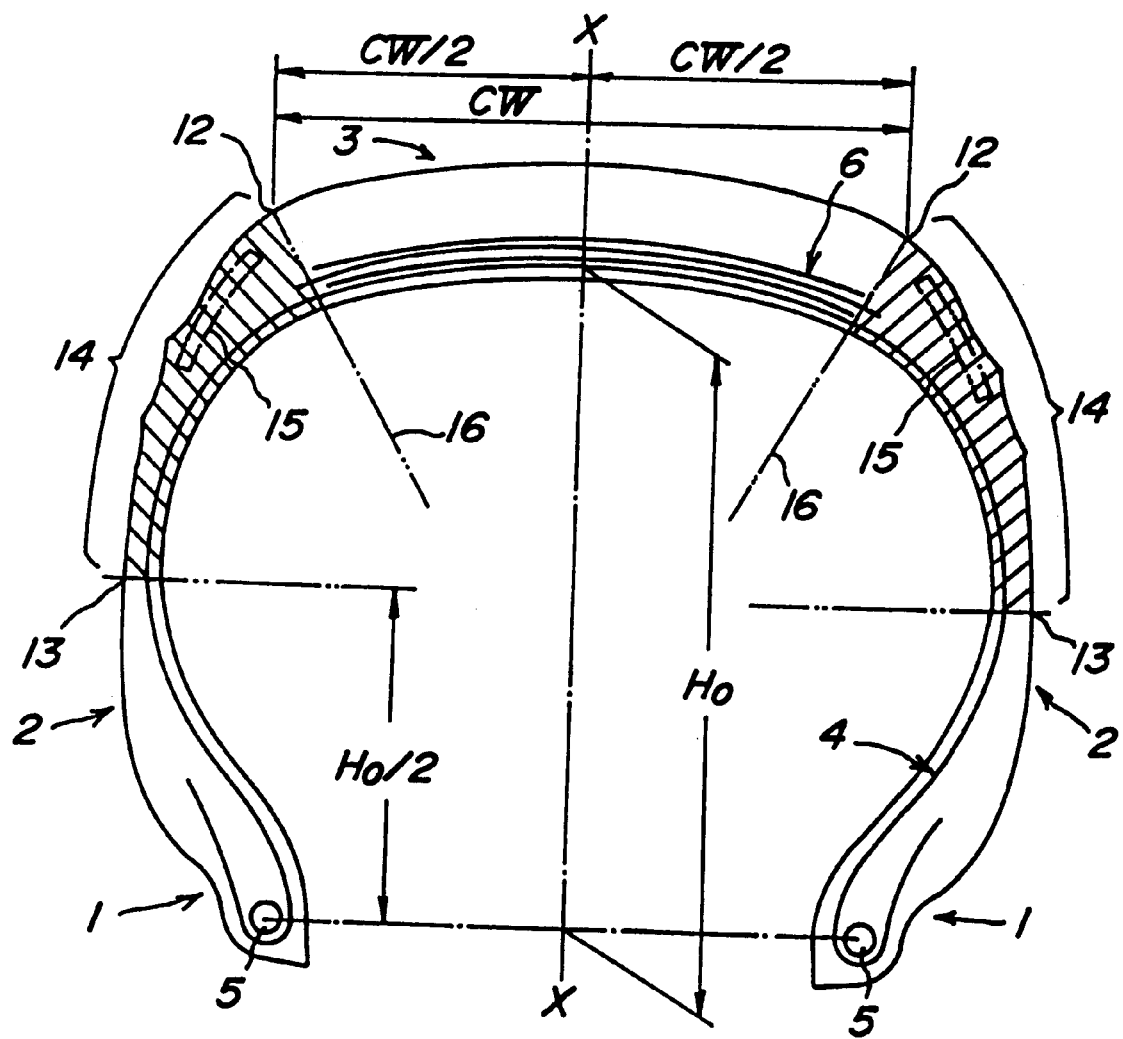
FIG. 9 is a meridional section view of a third pneumatic radial tire.

In other words according to FIG. 9 when a width between both outermost ground contact ends is CW, the above region 14 is a range separating outward from the equatorial plane X—X of the tire to not less than a width of CW/2 in the widthwise direction of the tire and separating outward from the bead core 5 to not less than $H_0/2$ in the radial direction of the tire. In this case, the boundary of the region 14 toward the tread side is specified by a normal line 16 drawn from the position of the outermost ground contact end to the outer surface of the tire in the illustrated section.

Figure 1:
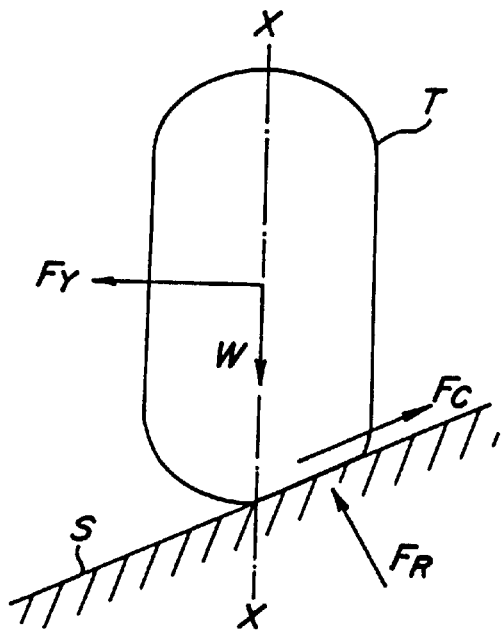
FIG. 1 is a schematic view illustrating a state of generating the wandering phenomenon.
Figure 2:
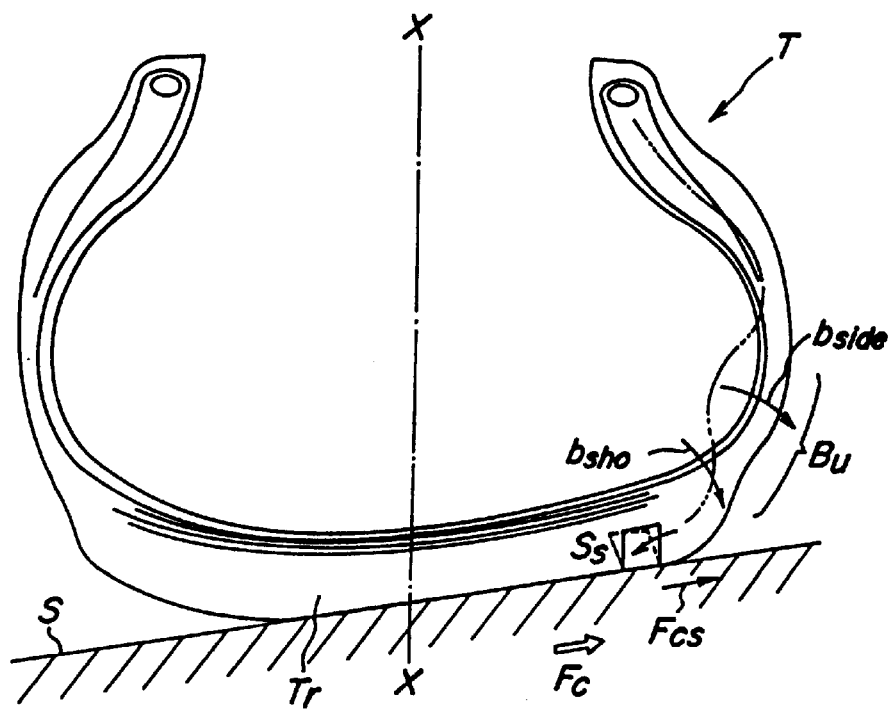
FIG. 2 is a meridional section view illustrating a state of generating camber thrust.

When the tire having such a structure is run on the slant face such as a rut or the like under loading as shown in FIG. 2, since the rubber hardness of the high-hardness rubber layer 15 arranged in the region 14 is higher than that of the tread rubber, the bulging deformation $b_{side}$ of a portion near to the buttress is easily transferred to a portion near to the ground contact end and hence a ground contact end portion of the tread portion, and as a result, the pushing-out deformation bsho and shearing deformation SS of tread rubber can be increased to bring about the sufficient increase of camber thrust $F_C$.

In this case, the reason why the arranging range of the high-hardness rubber layer 15 is restricted to the above region 14 is due to the fact that the large bulging deformation bside is particularly produced in this region. Further, the degree or more, preferably 5 degree or more as JIS A-hardness is due to the fact that when the difference of rubber hardness is less than 3 degree, it is difficult to except the sufficient development of the aforementioned functions.

The magnification of strain accompanied with the above bulging deformation bside or the transmission easiness of the deformation $b_{side}$ becomes particularly large at the outer surface side of the tire, so that it is advantageous to arrange the high-hardness rubber layer 15 near to the outer surface. For this end, it is preferable that the center of maximum thickness of the high-hardness rubber layer 15 as measured in the normal direction of the radial carcass 4 at the meridional section of the tire under the inflation of normal air pressure is located outward from the thickness center of the total tire thickness measured on the normal line passing through the maximum thickness position toward the outer surface of the tire.

In this connection, the high-hardness rubber layer 15 shown in FIG. 10 is arranged so that the surface facing the outer side of the tire is exposed to the outside of the tire.

A comparison test relating to the function of controlling the wandering phenomenon in the pneumatic radial tire of the above structure will be described below.

Test Tire

There are provided three radial tires for small-size truck having a tire size of 195/85 R16 114/112L LT, in which two tires having structures shown in FIG. 10 and 11 are invention tires 10 and 11 and the tire having the structure shown in FIG. 6 is a comparative tire.

In the invention tire 10 shown in FIG. 10, the high-hardness rubber layer 15 having a JIS A-hardness of 76 degrees, a thickness of 2.5 mm and a width of 25 mm is arranged to expose to the outer surface of the tire starting from a position of 70 mm from the equatorial plane X—X of the tire in the widthwise direction of the tire as previously mentioned. In this case, the JIS A-hardness of the tread rubber is 61 degrees.

In the high-hardness rubber layer 15, the maximum thickness measured in the normal direction of the carcass 4 is 2.8 mm and the thickness center thereof is existent in a position of 1.4 mm from the outer surface of the tire. Further, the total tire thickness measured on the same normal line is 13.5 mm and the thickness center thereof is existent in a position of 6.75 mm from the outer surface of the tire.

Further, the invention tire 11 shown in FIG. 11 has the same structure as in the invention tire 10 except that the high-hardness rubber layer 15 having substantially a triangular section of 25 mm in width and 11 mm in maximum thickness and a JIS A-hardness of 67 degrees is arranged starting from a position of 70 mm from the equatorial plane X—X of the tire at a depth of 0.5 mm from the outer surface.

In the high-hardness rubber layer 15 of the latter tire, the maximum thickness measured in the normal direction of the carcass 4 is 12.7 mm and the thickness center thereof is existent in a position of 6.85 mm from the outer surface of the tire. Further, the total tire thickness measured on the same normal line is 13.5 mm and the thickness center thereof is existent in a position of 6.75 mm from the outer surface of the tire.

Moreover, the comparative tire shown in FIG. 6 has the same structure as in the invention tire except that the high-hardness rubber layer 15 is omitted.

In these tires, the normal air pressure in accordance with the maximum load capacity (1180 kg) is 6.0 kgf/cm², and the ground contact width CW under a load (826 kg) corresponding to 70% of the maximum load capacity is 120 mm. Also, the carcass height $H_0$ from the bead core 5 at the inflation under the normal air pressure (6.0 kgf/cm²) is 136 mm.

Test Method

Each of these tires inflated under an air pressure of 6.0 kgf/cm² is mounted onto a small-size truck of 2 t capacity, in which a rear wheel is double-wheel type. The small-size truck is run on a paved road including ruts at a state of loading under a maximum authorized payload by a test driver, during which a straight running stability is feelingly evaluated.

The results are shown in Table 3.

In this case, the index of straight running stability is based on that the comparative tire is control, in which the larger the index value, the better the property.

As seen from Table 3, the straight running stability is considerably improved in the tires according to the invention.

TABLE 3

|  | JIS A-hardness of tread rubber | JIS A-hardness of high-hardness rubber layer | Straight running stability (index) |
| --- | --- | --- | --- |
| Comparative tire | 61 degrees | none | 100 |
| Invention tire 10 | 61 degrees | 76 degrees | 115 |
| Invention tire 11 | 61 degrees | 67 degrees | 127 |

Figure 12A:
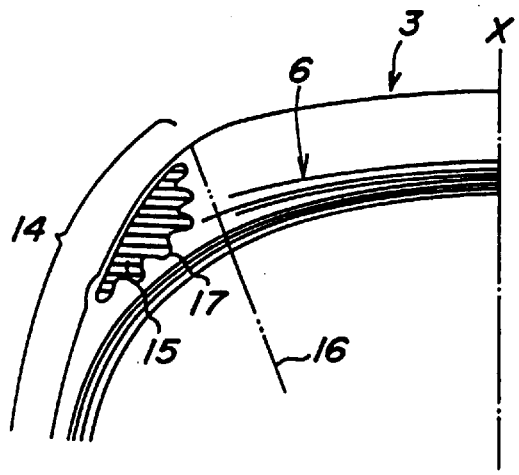
FIG. 12 is a section view illustrating another embodiment of the third pneumatic radial tire.
Figure 12B:
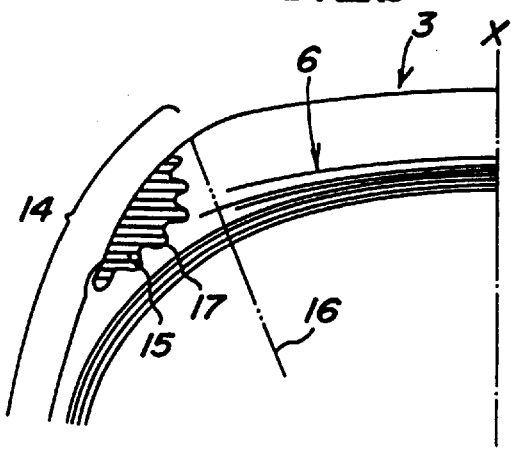

FIG. 12 is a meridional section of another practical embodiment of the third embodiment of the pneumatic radial tire, in which the surface of the high-hardness rubber layer 15 facing to the inner periphery side of the tire is waved. As shown in FIG. 12a, when the high-hardness rubber layer 15 is completely embedded in rubber within the region 14, the surface facing to the outer periphery side of the tire may also be waved.

In this way, the adhesion area between the high-hardness rubber layer 15 and the adjoining rubber layer is increased to increase the adhesion strength (adhesion force x adhesion area), so that the excellent peeling strength can be given to the high-hardness rubber layer 15 against strain repeatedly generated during the running of the tire under loading while maintaining the performance of controlling the wandering phenomenon likewise the aforementioned radial tires. Further, such a wave intersects at a large angle with respect to the progressing direction of the peel, so that it can effectively counteract to the progressing of the peel.

When an average wavelength of the waved portion 17 is not more than ⅓ of a total extension of the waved portion 17, the adhesion strength of the high-hardness rubber layer 15 can be more enhanced under the application of many waves.

Figure 13:
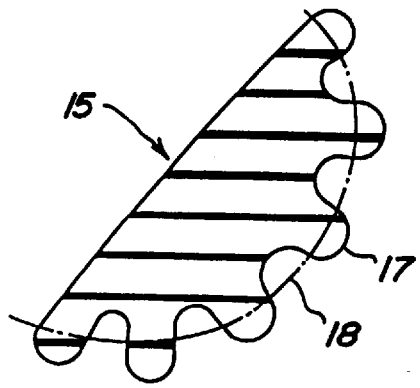
FIG. 13 is an enlarged view illustrating a wavy part of the high-hardness rubber layer.

When the total extension of the waved portion 17 is longer by 20% or more than a length of a line segment 18 passing through a center of the wave as shown by dot-dash line in FIG. 13, the adhesion area is further increased and hence the adhesion strength can be more further enhanced.

A comparison test relating to the wandering resistance of this pneumatic radial tire and the peeling resistance of the high-hardness rubber layer will be described below.

Test Tire

The invention tire having the structure shown in FIG. 11 and used in the above comparison test is a control tire and a tire having the structure shown in FIG. 12a is an invention tire 12.

In this case, the high-hardness rubber layer 15 of the control tire has the same dimension, properties and the like as mentioned above, while the high-hardness rubber layer 15 and the like of the invention tire 12 have the same arranging position, volume, properties as those of the control tire except that the shape is different from that of the control tire. Moreover, the total extension of the waved portion in the invention tire 12 is 125% of the corresponding portion of the control tire.

Test Method

The evaluation of the wandering resistance is carried out by feelingly evaluating the straight running stability when each of the radial tires having a tire size of 195/85 R16 114/112L LT is inflated under an air pressure of 6.0 kgf/cm² and mounted onto a small-size truck of 2 t capacity with a rear wheel of double-wheel type and then the small-size truck is run on a paved road including ruts at a state of loading under maximum load capacity. The results are shown in Table 4.

The index of the straight running stability is based on the fact that the control tire is 100, in which the larger the index value, the better the property.

Further, the evaluation of the peeling resistance is carried out by an index of a running distance until the peeling length grows to 5 mm when the tire is run on a drum at a speed of 50 km/h under a maximum normal loading in the inflation of normal air pressure (6.0 kgf/cm²) in accordance with the maximum loading capacity. The results are also shown in Table 4.

In this case, the larger the index value, the better the result.

TABLE 4

|  | JIS A-hardness of tread rubber | JIS A-hardness of high-hardness rubber layer | Straight running stability (index) | Peeling resistance (index) |
| --- | --- | --- | --- | --- |
| Control tire | 61 degrees | 67 degrees | 127 | 100 |
| Invention tire 12 | 61 degrees | 67 degrees | 128 | 130 |

As seen from Table 4, the invention tire 12 can largely enhance the peeling resistance with the some improvement of the straight running stability as compared with the control tire.

Figure 14:
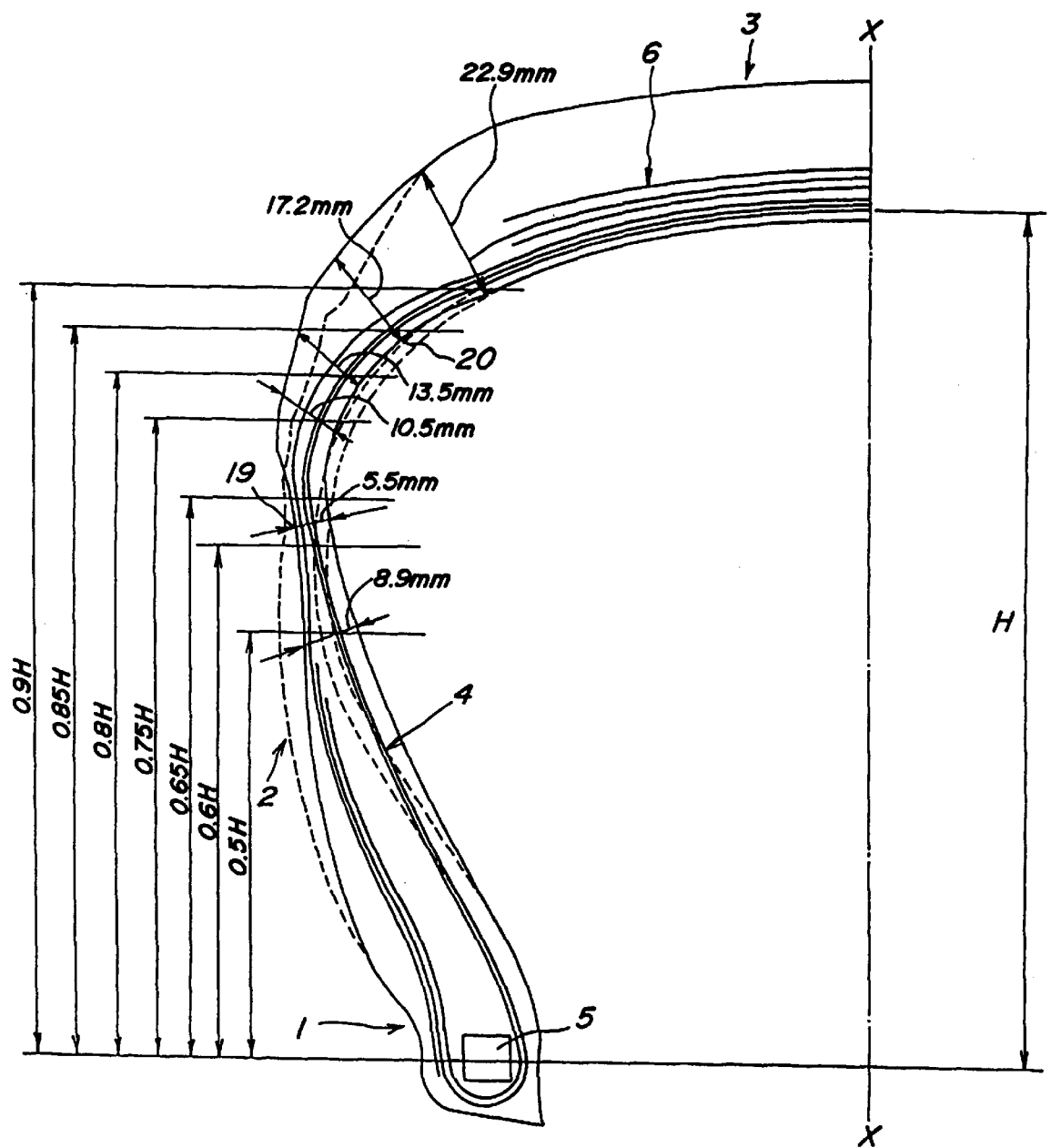
FIG. 14 is a meridional section view of a half portion of a fourth pneumatic radial tire.

FIG. 14 is a meridional section of the fourth pneumatic radial tire according to the invention. In this figure showing a tire for a small-size truck having a tire size of 195/85 R16, an invention tire is indicated by a solid line, and a comparative tire is indicated by a broken line.

In this case, a thinned portion 19 is formed in at least a part of the side portion locating within a range of 0.5–0.8 times, preferably 0.5–0.7 times the carcass height H from the bead core 5 at a state of inflating under an air pressure corresponding to 10% of the normal air pressure in accordance with the maximum loading capacity so minimum that a total tire thickness of this thinned portion as measured in the normal direction of the radial carcass 4 at the meridional direction of the tire is not more than 75% of a similarly measured minimum total tire thickness of the tire side portion located outside this range.

In the illustrated embodiment, the total tire thickness of the thinned portion 19 at a position of 0.63H from the bead core 5 is 5.5 mm, which corresponds to 61% of minimum thickness of 9.0 mm at a position other than the region of 0.5H–0.8H (position of 0.49H).

According to such a structure, the rigidity of the thinned portion 19 within a range of 0.5H–0.8H from the bead core 5 locally lowers as previously mentioned. The bending deformation in the illustrated section concentrates in the thinned portion 19 during the running of the tire on the slant face under loading to thereby increase the bulging deformation $b_{side}$ of a portion near to the buttress and hence the pushing-out deformation $b_{sho}$ of the portion near to the buttress is also increased to effectively increase the camber thrust FC.

The reason why the thinned portion 19 is arranged within a range of 0.5H–0.8H is due to the fact that when the portion is existent inward from 0.5H toward the bead core, it can not contribute to the increase of the bulging deformation $b_{side}$, while when the thinned portion is arranged at a position exceeding 0.8H or in the buttress portion, the bulging deformation $b_{side}$ can not effectively be transmitted to a portion near to the ground contact end and hence the ground contact end of the tread portion due to the lowering of the rigidity in the buttress portion.

Further, the reason why the thickness of the thinned portion 19 is not more than 75% of the thickness of the other portion is due to the fact that when it exceeds 75%, the difference of thickness and hence the difference of rigidity become small and it is difficult to sufficiently increase the bulging deformation $b_{side}$.

In such a tire, it is preferable that the position of maximum width of the radial carcass 4 is located within a range of 0.6–0.8 times the carcass height H from the bead core 5. In the illustrated embodiment, the maximum width position is at 0.69H.

It is further favorable that not less than 80% of a portion of the radial carcass 4 having a maximum curvature is existent within a range of 0.65–0.85H the carcass height H from the bead core 5. In the illustrated embodiment, the maximum curvature is ⅓ and 100% of the maximum curvature portion is located within the above range.

By locating the maximum width position of the carcass 4 within a range of 0.6H–0.8H, preferably 0.7H–0.8H, it is possible to increase the bulging deformation $b_{side}$ and also it is possible to effectively approach the position of generating the bulging deformation bside to the buttress region to more effectively increase the pushing-out deformation bsho produced through the bulging deformation $b_{side}$. On the other hand, the carcass tension in the inflation under the air pressure is sufficiently made small within the above range, whereby the bulging deformation $b_{side}$ can be more increased.

When the maximum width position is a position of less than 0.6H, there is a fear that the sufficiently large bulging deformation $b_{side}$ is not obtained. When it is a position of more than 0.8H, the maximum width position of the carcass 4 is too near to the end portion of the belt easily forming trouble nucleus during the running of the tire under loading and hence there is caused a fear of lowering the tire durability to heat generation, the belt durability and the like.

By locating not less than 80% of the portion having the maximum carcass curvature within a range of 0.65H–0.85H, preferably 0.7H–0.85H, the bulging deformation $b_{side}$ and the pushing-out deformation bsho can effectively be increased likewise the case that the maximum width position of the carcass 4 is selected within a range of 0.6–0.8H.

That is, when it is less than 0.65H, it is difficult to increase the bulging deformation bside to a satisfactory level. When it exceeds 0.85H, the lowering of the durability to heat generation, belt durability and the like is feared.

Moreover, it is favorable that the total tire thickness measured in the normal direction of the radial carcass 4 at the meridional section of the tire at a position corresponding to 0.85 times the carcass height H from the bead core 5 is not less than 0.64 times the similar total tire thickness at a position of the side edge of the belt. As a result the reinforcing effect of the buttress region is enhanced and also the rigidity of the second tread zone can be increased. That is, when the ratio is less than 0.64 times, it is difficult to sufficiently develop the above functions.

The definition of the total tire thickness ratio at the side edge position of the belt and the position of 0.85H is based on the knowledge that the total tire thickness at the side edge position of the belt largely affects the rigidity of the tread portion during the running of the tire on the slant face and such a total tire thickness is mainly determined by considering the durability to heat generation, wear resistance and the like as main properties of the tire. The influence of the total tire thickness at the position of 0.85H is considerably large as compared with the other portion in order to increase the bulging deformation bside and the pushing-out deformation $b_{sho}$.

In the illustrated embodiment, the thickness at the side edge position of the belt is 22.9 mm, and the thickness at the position of 0.85H is 17.2 mm, so that the ratio is about 0.75 times.

More preferably, a thickened portion is formed in at least a part of the side portion locating within a range of 0.8–0.85 times the carcass height H from the bead core 5 so that the total tire thickness in the normal direction of the radial carcass 4 at the meridional section of the tire is not less than 1.5 times the similar total tire thickness at a position corresponding to 0.75 times the carcass height H from the bead core 5. In the illustrated embodiment, the total tire thickness of the thickened portion 20 at a position of 0.85H is 17.2 mm and that at a position of 0.75H is 10.5 mm, so that the ratio is about 1.64 times.

According to such a structure, the rigidity of the second tread zone can be largely increased by the thickened portion 20 to effectively reinforce the buttress region. Therefore, the bulging deformation $b_{side}$ and the pushing-out deformation bsho can largely be increased to bring about the effective increase of the shearing deformation $S_S$.

Moreover, when the ratio is less than 1.5 times, it is difficult to ensure the sufficient development of the above effect.

Figure 15:
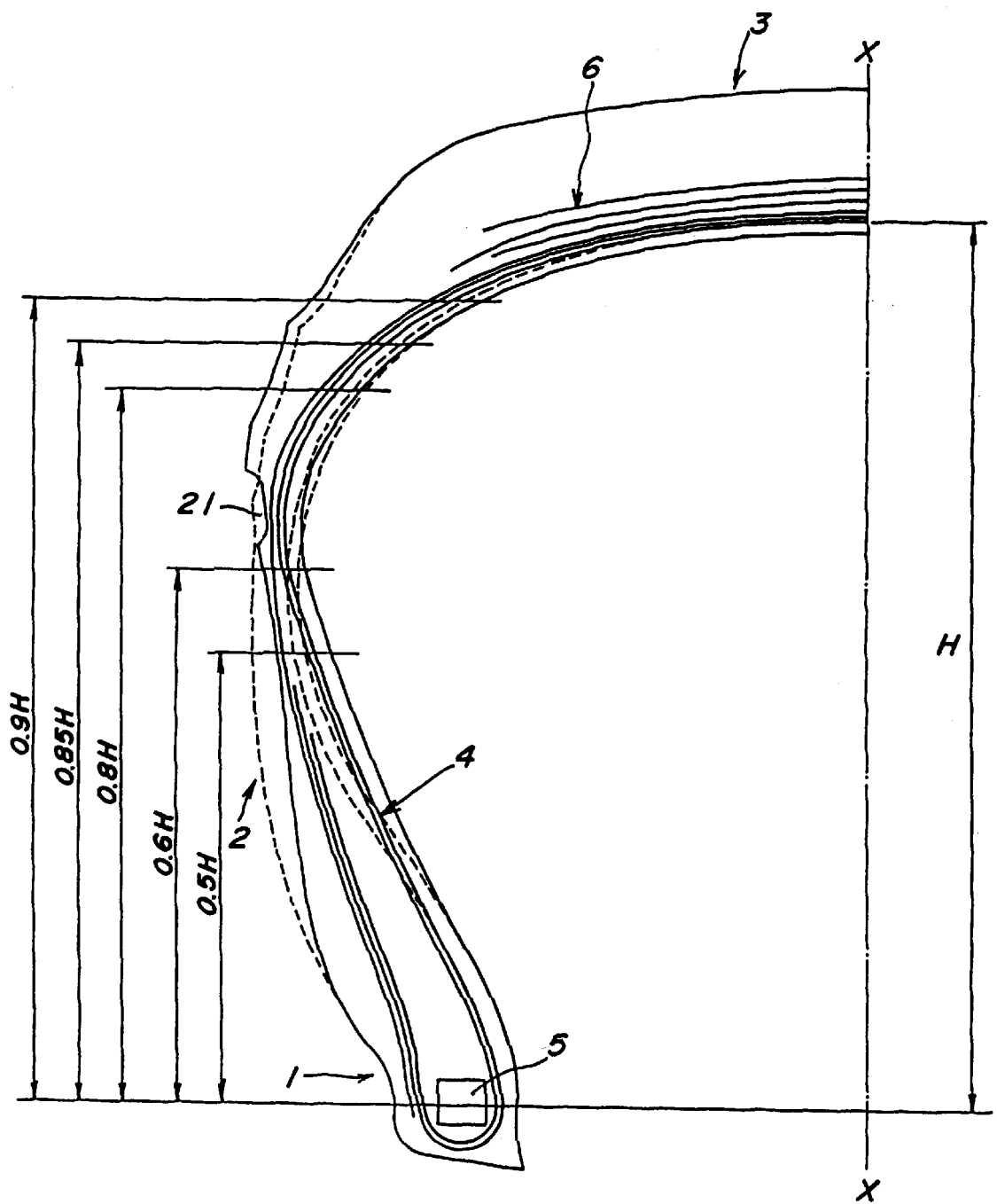
FIG. 15 is a meridional section view illustrating another embodiment of the fourth pneumatic radial tire.

FIG. 15 is a section view illustrating another practical embodiment of the fourth embodiment of the pneumatic radial tire, in which a thinned portion 21 located within a range of 0.5H–0.8H, preferably 0.5H–0.7H is locally thinned. In this figure, the minimum thickness of the thinned portion 21 is 5.5 mm at the position of 0.62H.

Such a thinned portion 21 can effectively function the increase of the camber thrust FC likewise the above thinned portion 19 gradually reducing the thickness, but also can particularly control the occurrence of damage produced due to the violent reduction of the thickness when the tire side portion is rubbed by an edge of a road during the running of, for example, a bus owing to the above local thinning.

A comparison test relating to the performance of controlling the wandering phenomenon in the above pneumatic radial tire will be described below.

Test Tire

There are provided radial tires for small-size truck having the structure shown by a solid line in FIG. 14 and a tire size of 195/85 R16 114/112L LT by varying thickness distribution of side portion and carcass line as shown in Table 5 as invention tires 13–16, while a tire shown by broken line in the same figure is a comparative tire.

Test Method

Each of these tires is inflated under a normal air pressure of 6.0 kgf/cm² in accordance with the maximum loading capacity and mounted onto a small-size truck of 2 ton capacity (rear wheel is double-wheel type). The small-size truck is run on a paved road including ruts at a state of loading under a maximum authorized payload by a test driver, during which a straight running stability is feelingly evaluated.

The results are also shown in Table 5 by an index evaluation that the comparative tire is control (the larger the index value, the better the property).

As seen from this table, the tires according to the invention considerably improve the straight running stability.

TABLE 5

| Tire | Thin gauge region (H65 gauge/ H49 gauge) | Position of carcass maximum width | Position of carcass maximum curvature | Thick gauge region (H85 gauge/ belt side edge gauge) (H85 gauge/ H75 gauge) | | Straight running stability |
| --- | --- | --- | --- | --- | --- | --- |
| Comparative tire | 0.82 | 0.55 H | 0.5 H | 0.59 | 1.42 | 100 |
| Invention tire 13 | 0.61 | 0.55 H | 0.5 H | 0.59 | 1.42 | 110 |
| Invention tire 14 | 0.61 | 0.72 H | 0.5 H | 0.59 | 1.42 | 114 |
| Invention tire 15 | 0.61 | 0.72 H | 0.78 H | 0.59 | 1.42 | 118 |
| Invention tire 16 | 0.61 | 0.72 H | 0.78 H | 0.75 | 1.64 | 127 |

Note)
H65 gauge/H49 gauge and the like indicate ratio of thickness at position of 0.49 H from bead core to thickness at position of 0.65 H from bead core.

As seen from the above, the pneumatic radial tires according to the invention can effectively control the occurrence of wandering phenomenon when being applied to vehicles such as passenger car, small-size truck, truck, bus and the like and particularly can realize the excellent straight running stability even on road surfaces including ruts and the like during the high-speed running of the vehicle.

What is claimed is:

1. A pneumatic radial tire comprising; a pair of bead portions with a bead core therein, a pair of sidewall portions, a tread portion toroidally extending between both sidewall portions, a radial carcass reinforcing these portions and a belt reinforcing the tread portion at the outer circumferential side of the radial carcass, in which a thinned portion is formed in at least a part of each tire side portion located within a range of 0.5–0.8 times the carcass height (H) from the bead core at a state of inflating under an air pressure corresponding to 10% of the normal air pressure so that a minimum total tire thickness of this thinned portion as measured in the normal direction of the radial carcass at the meridional section of the tire is not more than 75% of a similarly measured minimum total tire thickness of the side portion located outside said range of 0.5–0.8 times the carcass height.

2. A tire according to claim 1, wherein a position of the maximum width of the radial carcass is located within a range of 0.6–0.8 times the carcass height (H) from the bead core at a state of inflating under an air pressure corresponding to 10% of the normal air pressure.

3. A tire according to claim 1, wherein not less than 80% of a portion having a maximum curvature of the radial carcass in each tire side portion at the meridional section of the tire is located within a range of 0.65–0.85 times the carcass height (H) from the bead core at a state of inflating under an air pressure corresponding to 10% of the normal air pressure.

4. A tire according to claim 1, wherein the total tire thickness of each tire side portion at the meridional section of the tire as measured in the normal direction of the radial carcass at 0.85 times the carcass height (H) from the bead core at a state of inflation under an air pressure corresponding to 10% of the normal air pressure is not less than 0.64 times the similarly measured total tire thickness at each side edge of the belt.

5. A tire according to claim 1, wherein a thickened portion is formed in at least a part of each tire side portion located within a range of 0.8–0.85 times the carcass height (H) from the bead core at a state of inflation under an air pressure corresponding to 10% of the normal air pressure so that the total tire thickness of this thickened portion as measured in the normal direction of the radial carcass at the meridional section of the tire is not less than 1.5 times the similarly measured total tire thickness at 0.75 times the carcass height (H) from the bead core.

* * * * *